(12) United States Patent
Copelli Yañez

(10) Patent No.: US 8,252,199 B2
(45) Date of Patent: Aug. 28, 2012

(54) COOLANT COMPOSITION

(75) Inventor: Pablo Copelli Yañez, Barcelona (ES)

(73) Assignee: Jacob Technology Product 1, SL, Barcelona (ES)

( * ) Notice: Subject to any disclaimer, the term of this patent is extended or adjusted under 35 U.S.C. 154(b) by 184 days.

(21) Appl. No.: 12/844,948

(22) Filed: Jul. 28, 2010

(65) Prior Publication Data

US 2011/0024674 A1 Feb. 3, 2011

Related U.S. Application Data

(60) Provisional application No. 61/229,136, filed on Jul. 28, 2009, provisional application No. 61/229,142, filed on Jul. 28, 2009, provisional application No. 61/229,242, filed on Jul. 28, 2009.

(51) Int. Cl.
*C09K 5/02* (2006.01)

(52) U.S. Cl. ......................... 252/70; 252/75; 165/104.12

(58) Field of Classification Search ........................ None
See application file for complete search history.

(56) References Cited

U.S. PATENT DOCUMENTS

| | | | |
|---|---|---|---|
| 2,366,989 A | 1/1945 | Robertson | |
| 4,112,066 A | 9/1978 | Hussein | |
| 4,205,685 A | 6/1980 | Yoshida et al. | |
| 5,009,893 A | 4/1991 | Cherukuri et al. | |
| 5,148,804 A | 9/1992 | Hill et al. | |
| 5,513,629 A | 5/1996 | Johnson | |
| 5,843,466 A | 12/1998 | Mane et al. | |
| 6,051,159 A | 4/2000 | Hao | |
| 6,217,606 B1 | 4/2001 | Portnoy et al. | |
| 6,379,582 B1 * | 4/2002 | Putman | .......................... 252/70 |
| 2009/0301118 A1 | 12/2009 | Chen | |

FOREIGN PATENT DOCUMENTS

GB 2302651 1/1997

OTHER PUBLICATIONS

International Search Report.

* cited by examiner

*Primary Examiner* — Necholus Ogden, Jr.
(74) *Attorney, Agent, or Firm* — Mateo Aboy; Aboy & Associates PC

(57) ABSTRACT

The disclosed embodiments include coolant compositions, packages of such compositions, and articles of manufacture derived from coolant compositions. According to one embodiment disclosed a liquid coolant composition is disclosed that comprises: (a) glycerol, (b) an aqueous solution of menthol, (c) calcium hydroxide, (d) barium hydroxide, and (e) water. According to another embodiment, a gel coolant composition is disclosed that comprises: (a) glycerol, (b) an aqueous solution of menthol, (c) calcium hydroxide, (d) barium hydroxide, (e) water, and (f) sodium polyacrylate. Such gel coolant composition can be converted to solid form by adding paraffin.

6 Claims, 21 Drawing Sheets

COOLANT COMPOSITION

CROSS-REFERENCE TO RELATED APPLICATIONS

This application claims the benefit of U.S. Provisional Application No. 61/229,136, U.S. Provisional Application No. 61/229,142, and U.S. Provisional Application No. 61/229,242 filed on 2009 Jul. 28 by the present inventor, which are incorporated herein by reference.

TECHNICAL FIELD

The present invention relates to coolant compositions. Specifically, it relates to coolant compositions, packages for such compositions, and articles of manufacture derived from such compositions.

BACKGROUND

Coolant compositions are used for a variety of applications. For instance, U.S. Pat. No. 7,258,814 discloses a coolant composition having glycol as a main component, which prevents iron and aluminum from being corroded, and in particular, has corrosion preventing properties for aluminum and aluminum alloys at high temperatures. U.S. Pat. No. 7,387,748 comprises an improved antifreeze coolant composition with certain additives that serve to increase the thermal stability of the glycol component of a glycol/water coolant composition and to reduce the tendency of the glycol component to degrade under elevated thermal conditions. These additives comprise organic compounds with a carboxylic acid moiety and a hydroxyl moiety, and also tricarballylic acid. U.S. Pat. No. 6,146,546 discloses a freezable coolant composition used for cold-preservation of foods by utilizing the latent heat of fusion at the freezing point which is substantially higher than 0° C. U.S. Pat. No. 5,843,466 discloses coolant compositions, flavorant compositions, ingestible and topical compositions containing at least one coolant compound selected from monomenthyl succinate, alkali metal salts of monomenthyl succinate, alkaline earth metal salts of monomenthyl succinate and mixtures thereof. These compositions are found to provide a pleasant, long-lasting cooling effect without bitterness and the cooling effect manifests itself differently than the cooling effect of other known coolants.

A variety of compounds are known which provide a cooling sensation when ingested or contacted with the body. One of the best known of these compounds is menthol. Menthol is an organic compound made synthetically or obtained from peppermint or other mint oils. It is a waxy, crystalline substance that is solid at room temperature and melts slightly above. Menthol's ability to chemically trigger the cold-sensitive TRPM8 receptors in the skin is responsible for the cooling sensation that it provokes when inhaled, eaten, or applied to the skin. Menthol acts on the cold receptors at the nerve endings in order to provide this cooling effect.

Since menthol has a strong minty odor and high relative volatility, several other coolant compounds have been developed and reported in the technical literature as potential flavorants or odorants in a variety of topical and ingestible compositions. For example, U.S. Pat. No. 5,009,893 proposes the use of menthol in combination with N-substituted-p-menthane carboxamide compounds as coolant compositions in edible products.

A limitation of the coolant compositions currently reported in the literature and commercially available is their limited ability to be safely applied in a plurality of application areas without significant re-engineering effort due to both their cooling properties and packaging design.

SUMMARY

The disclosed embodiments relate to coolant compositions, packages of such compositions, and articles of manufacture derived from coolant compositions including menthol and glycerol. According to one embodiment disclosed herein, and without limitation, a liquid coolant composition is disclosed that comprises: (a) glycerol, (b) an aqueous solution of menthol, (c) calcium hydroxide, (d) barium hydroxide, and (e) water. According to another embodiment disclosed herein, and without limitation, a gel coolant composition is disclosed that comprises: (a) glycerol, (b) an aqueous solution of menthol, (c) calcium hydroxide, (d) barium hydroxide, (e) water, and (f) sodium polyacrylate. Such gel coolant composition can be converted to solid form by adding paraffin.

BRIEF DESCRIPTION OF THE DRAWINGS

Disclosed embodiments are illustrated by way of example, and not by way of limitation, in the figures of the accompanying drawings. These drawings illustrate embodiments of packages for the disclosed coolant composition and sample articles of manufacture.

DETAILED DESCRIPTION

Figure 1:
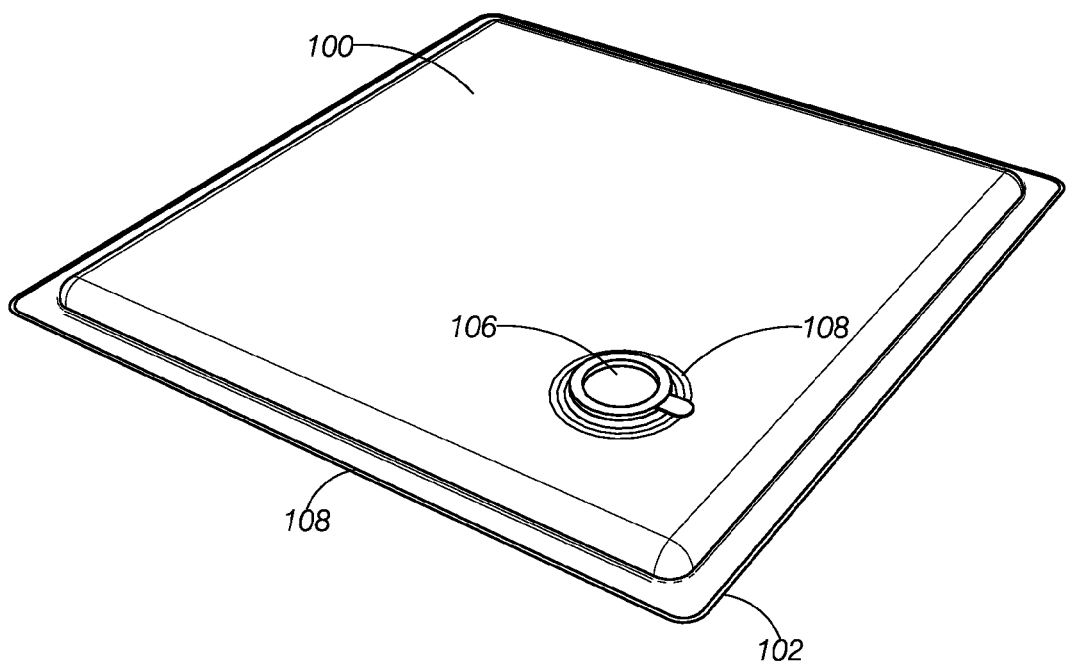
FIG. 1 shows an embodiment of the packaged coolant.

The disclosed embodiments relate to coolants. Specifically, they relate to coolant compositions, packages of such compositions, and articles of manufacture derived from coolant compositions including menthol and glycerol. More particularly, the disclosed embodiments provide a coolant composition, packages for such composition, and articles of manufacture derived from the disclosed composition that can be used in a plurality of applications without the need for significant re-design.

According to one embodiment disclosed herein, and without limitation, the liquid coolant composition comprises: (a)

glycerol, (b) an aqueous solution of menthol, (c) calcium hydroxide, (d) barium hydroxide, and (e) water.

According to one embodiment disclosed herein, and without limitation, the gel coolant composition comprises: (a) glycerol, (b) an aqueous solution of menthol, (c) calcium hydroxide, (d) barium hydroxide, (e) water, and (f) sodium polyacrylate.

According to one embodiment disclosed herein, and without limitation, the solid coolant composition comprises: (a) glycerol, (b) an aqueous solution of menthol, (c) calcium hydroxide, (d) barium hydroxide, (e) water, (f) sodium polyacrylate, and (g) paraffin. According to one embodiment disclosed herein, the solid coolant compound is protected by an external waterproof material.

A. Disclosed Embodiments of the Coolant Composition

The following section discloses embodiments of the coolant composition. These embodiments are meant simply to illustrate possible examples of the coolant composition and should not be interpreted as limitations.

A.1. Coolant Composition in Liquid Form

In its most basic embodiment, the liquid coolant composition comprises: (a) glycerol, (b) an aqueous solution of menthol, and (c) water.

According to one embodiment disclosed herein, and without limitation, the liquid coolant composition comprises: (a) glycerol, (b) an aqueous solution of menthol, (c) calcium hydroxide, (d) barium hydroxide, and (e) water. Glycerol is a chemical compound also commonly called glycerin or glycerine. It is a colorless, odorless, viscous liquid that is widely used in pharmaceutical formulations. Glycerol is used in medical, pharmaceutical, and personal care preparations, mainly as a means of improving smoothness, providing lubrication and as a humectant. It is found in cough syrups, elixirs and expectorants, toothpaste, mouthwashes, skin care products, shaving cream, hair care products, soaps and water based personal lubricants. It is also an ingredient in cigarettes that is used as a humectant. According to one embodiment and without limitation, 99% pure glycerol $C_3H_8O_3$ is used in the coolant. Specifically, glycerol is used in the composition primarily to maintain and absorb the temperature applied. Menthol is an organic compound made synthetically or obtained from peppermint or other mint oils. It is a waxy, crystalline substance, clear or white in color, which is solid at room temperature and melts slightly above. Menthol's ability to chemically trigger the cold-sensitive TRPM8 receptors in the skin is responsible for the cooling sensation that it provokes when inhaled, eaten, or applied to the skin. According to one embodiment, menthol $C_{10}H_{20}O$ is dissolved in water. Calcium hydroxide $Ca(OH)_2$ is a colorless crystal or white powder, and is obtained when calcium oxide is mixed with water. It can also be precipitated by mixing an aqueous solution of calcium chloride and an aqueous solution of sodium hydroxide. In this composition it is used to prevent the proliferation of bacteria that could contaminate the compound once it is applied to the sponge. Finally, barium hydroxide $Ba(OH)_2$ can be prepared by dissolving barium oxide (BaO) in water. Its aqueous solution, being highly alkaline, undergoes neutralization reactions with acids. In this compound, barium oxide is used primarily to maintain the properties of glycerol. Table 1 discloses an embodiment of the liquid coolant with example percentages. According to this embodiment the coolant composition comprises: (a) from about 3% to about 10%, by weight of the composition, of glycerol $C_3H_8O_3$, (b) from about 0.1% to about 1.2%, by weight of the composition, of water and menthol $H_2O+C_{10}H_{20}O$, (c) from about 0.06% to about 0.1%, by weight of the composition, of calcium hydroxide $Ca(OH)_2$ 2 mol/l, (d) from about 0.02% to about 0.08%, by weight of the composition, of barium hydroxide $Ba(OH)_2 \times 8H_2O$, and (e) from about 90% to about 97%, by weight of the composition, of water $H_2O$.

TABLE 1

Coolant Composition and Percentages According to One Embodiment.

| Composition | Chemical Formula | Percentage |
| --- | --- | --- |
| Glycerol | $C_3H_8O_3$ | 3-10% |
| Water + Menthol | $H_2O + C_{10}H_{20}O$ | 0.1-1.2% |
| Calcium Hydroxide | $Ca(OH)_2$ 2 mol/l | 0.06-0.1% |
| Barium Hydroxide | $Ba(OH)_2 \times 8H_2O$ | 0.02-0.08% |
| Water | $H_2O$ | 90-97% |

While a particular embodiment of the liquid composition has been described, it is understood that, after learning the teachings contained in this application with the disclosed embodiments, modifications and generalizations will be apparent to those skilled in the art without departing from the spirit of the disclosed embodiments.

A.2. Coolant Composition in Gel Form

In its most basic embodiment, the gel coolant composition comprises: (a) glycerol, (b) an aqueous solution of menthol, (c) water, and (d) sodium polyacrylate.

According to one embodiment disclosed herein, and without limitation, the gel coolant composition comprises: (a) glycerol, (b) an aqueous solution of menthol, (c) calcium hydroxide, (d) barium hydroxide, (e) water, and (f) sodium polyacrylate. According to one embodiment and without limitation, 99% pure glycerol $C_3H_8O_3$ is used in the coolant. Specifically, glycerol is used in the composition primarily to maintain and absorb the temperature applied. According to one embodiment, menthol $C_{10}H_{20}O$ is dissolved in water. Calcium hydroxide $Ca(OH)_2$ is a colorless crystal or white powder, and is obtained when calcium oxide is mixed with water. It can also be precipitated by mixing an aqueous solution of calcium chloride and an aqueous solution of sodium hydroxide. In this composition it is used to prevent the proliferation of bacteria that could contaminate the compound once it is applied to the sponge. Finally, barium hydroxide $Ba(OH)_2$ can be prepared by dissolving barium oxide (BaO) in water. Its aqueous solution, being highly alkaline, undergoes neutralization reactions with acids. In this compound, barium oxide is used primarily to maintain the properties of glycerol. Sodium polyacrylate $CH_2CH_2(CO_2Na)$ is also named acrylic sodium salt polymer. It has the ability to absorb as much as 200 to 300 times its mass in water and is also known as Super Absorbent or SAP (super absorbent polymer). Sodium polyacrylate is responsible for converting the compound from its liquid state to a gel. Table 2 discloses an embodiment of the gel coolant with example percentages. According to this embodiment the coolant composition comprises: (a) from about 3% to about 10%, by weight of the composition, of glycerol $C_3H_8O_3$, (b) from about 0.1% to about 1.2%, by weight of the composition, of water and menthol $H_2O+C_{10}H_{20}O$, (c) from about 0.06% to about 0.1%, by weight of the composition, of calcium hydroxide $Ca(OH)_2$ 2 mol/l, (d) from about 0.02% to about 0.08%, by weight of the composition, of barium hydroxide $Ba(OH)_2 \times 8H_2O$, (e) from about 90% to about 97%, by weight of the composition, of water $H_2O$, and (f) from about 1% to about 4%, by weight of the composition, of sodium polyacrylate $CH_2CH_2(CO_2Na)$ with 99% purity.

TABLE 2

Coolant Composition and Percentages According to One Embodiment.

| Composition | Chemical Formula | Percentage |
|---|---|---|
| Glycerol | $C_3H_8O_3$ | 3-10% |
| Water + Menthol | $H_2O + C_{10}H_{20}O$ | 0.1-1.2% |
| Calcium Hydroxide | $Ca(OH)_2$ 2 mol/l | 0.06-0.1% |
| Barium Hydroxide | $Ba(OH)_2 \times 8H_2O$ | 0.02-0.08% |
| Water | $H_2O$ | 90-97% |
| Sodium polyacrylate | $CH_2CH_2(CO_2Na)$ | 1-4% |

According to a more specific embodiment illustrated by way of example, and not by way of limitation, 1.1 to 2.5 liters of the gel coolant compound comprises: a) 100 ml of glycerol with 99% purity $C_3H_8O_3$, b) 6 g of menthol $C_3H_8O_3$ dissolved in 12 ml of water, c) 2 ml of calcium hydroxide $Ca(OH)_2 \times 8H_2O$, d) 0.8 g of barium hydroxide $Ba(OH)_2$, e) water $H_2O$, and (d) 2-4 g of sodium polyacrylate. While a particular embodiment of the gel composition has been described, it is understood that, after learning the teachings contained in this application with the disclosed embodiments, modifications and generalizations will be apparent to those skilled in the art without departing from the spirit of the disclosed embodiments.

A.3. Coolant Composition in Solid Form

In its most basic embodiment, the solid coolant composition comprises: (a) glycerol, (b) an aqueous solution of menthol, (c) water, (d) sodium polyacrylate, and (e) paraffin.

According to one embodiment disclosed herein, and without limitation, the solid coolant composition comprises: (a) glycerol, (b) an aqueous solution of menthol, (c) calcium hydroxide, (d) barium hydroxide, (e) water, (f) sodium polyacrylate, and (g) paraffin. According to one embodiment and without limitation, 99% pure glycerol $C_3H_8O_3$ is used in the coolant. According to one embodiment, menthol $C_{10}H_{20}O$ is dissolved in water. Calcium hydroxide $Ca(OH)_2$ is a colorless crystal or white powder, and is obtained when calcium oxide is mixed with water. Barium hydroxide $Ba(OH)_2$ can be prepared by dissolving barium oxide (BaO) in water. Its aqueous solution, being highly alkaline, undergoes neutralization reactions with acids. In this compound, barium oxide is used primarily to maintain the properties of glycerol. Sodium polyacrylate $CH_2CH_2(CO_2Na)$ is also named acrylic sodium salt polymer and has the ability to absorb as much as 200 to 300 times its mass in water and is a polymer, also known as Super Absorbent or SAP (super absorbent polymer). Sodium polyacrylate is responsible for converting the compound from its liquid state to a gel. Paraffin such as $C_{25}H_{52}$ is added to the coolant compound in its gel state in order to create the solid coolant compound. Paraffin has excellent thermal storage properties, changing phase at high temperatures. Different paraffins can be used depending on the use of the material and the application area, especially the temperature it is designed to cool. In this product the heat is absorbed by the glycerol inside the sodium polyacrylate and it is displaced to the paraffin which changes from the solid state to a liquid state, changing phase and absorbing the heat. When heat transfer stops, the paraffin becomes solid and transfers the heat to the glycerol. Table 3 discloses an embodiment of the solid coolant with sample percentages and compounds (for instance, other paraffins can be used).

TABLE 3

Coolant Composition and Percentages According to One Embodiment.

| Composition | Chemical Formula | Percentage |
|---|---|---|
| Glycerol | $C_3H_8O_3$ | 3-10% |
| Water + Menthol | $H_2O + C_{10}H_{20}O$ | 0.1-1.2% |
| Calcium Hydroxide | $Ca(OH)_2$ 2 mol/l | 0.06-0.1% |
| Barium Hydroxide | $Ba(OH)_2 \times 8H_2O$ | 0.02-0.08% |
| Water | $H_2O$ | 90-97% |
| Sodium polyacrylate | $CH_2CH_2(CO_2Na)$ | 1-4% |
| Paraffin | $C_{25}H_{52}$ | 0.8%-5% |

According to a more specific embodiment illustrated by way of example, and not by way of limitation, 1.1 to 2.5 liters of the solid coolant compound comprises: a) 100 ml of glycerol with 99% purity $C_3H_8O_3$, b) 6 g of menthol $C_3H_8O_3$ dissolved in 12 ml of water, c) 2 ml of calcium hydroxide $Ca(OH)_2 \times 8H_2O$, d) 0.8 g of barium hydroxide $Ba(OH)_2$, e) water $H_2O$, (f) 2-4 g of sodium polyacrylate, and (g) paraffin.

While a particular embodiment of the solid composition has been described, it is understood that, after learning the teachings contained in this application with the disclosed embodiments, modifications and generalizations will be apparent to those skilled in the art without departing from the spirit of the disclosed embodiments.

B. Disclosed Embodiments of the Process of Manufacture

The following section describes the process for realizing 1 liter of an initial liquid solution according to one embodiment. This embodiment is meant simply to illustrate an example of the liquid coolant composition and should not be interpreted as a limitation.

The first step involves dissolving 6 g of menthol with 60 ml of water. Since menthol is in a solid crystalline state, the dissolution can be accomplished by means of a centrifuge machine or by applying heat since the compound melts at 40° C. According to one embodiment, the centrifuge machine is operated a low speeds for 15 min. This compound is used in the formulation due to its cooling effects and also because of its antiseptic properties. In this embodiment, 100 ml of glycerol, a compound used to maintain and absorb the temperature applied is mixed with 2 ml of calcium hydroxide which is used to prevent the proliferation of bacteria that could contaminate the chemical on the applied product (for instance, a textile or a sponge). By stirring the solution for a few minutes to dissolve the calcium hydroxide dissolution, an alkaline solution is obtained. Next we add the menthol solution and filter the precipitated crystals. Finally, we add 0.8 g of barium hydroxide $Ba(OH)_2 \times 8H_2O$ to keep the properties of glycerol.

The previous compound results in a liquid coolant composition that can be converted into a gel by adding sodium polyacrylate with 99% purity. This is due to its high molecular mass. The amount of sodium polyacrylate depends on the desired viscosity of the final composition. As an example, and without limitation, 2 g sodium polyacrylate per liter leads to normal gel viscosities. Finally, paraffin is added in order to create the solid coolant compound.

While a particular embodiment of the process of manufacture for realizing 1 liter of the solution has been described and the process for converting it into a gel and its subsequent conversion to a solid, it is understood that, after learning the teachings contained in this application with the disclosed embodiments, modifications and generalizations will be apparent to those skilled in the art without departing from the spirit of the invention.

C. Disclosed Embodiments of the Packaged Composition Article of Manufacture

The following section discloses embodiments of the packaged composition as an article of manufacture. These embodiments are meant simply to illustrate possible examples and should not be interpreted as limiting.

C.1. Packages for Liquid Coolant, Gel Coolant, and Certain Solid Coolants

Figure 2:
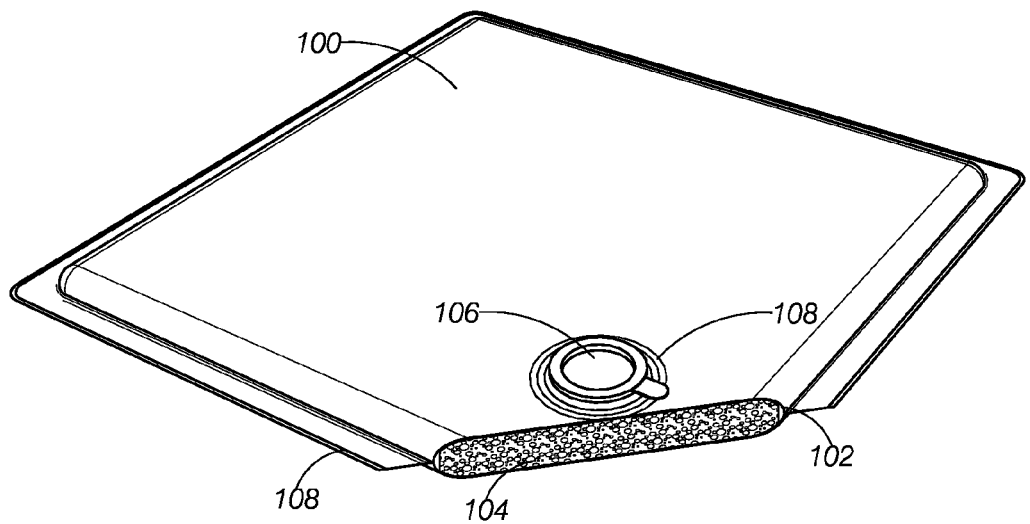
FIG. 2 shows an embodiment of the packaged coolant including a section illustration of an optional internal sponge which may be completely substituted by the gel coolant composition.

FIG. 1 shows an embodiment of the packaged coolant. FIG. 2 shows an embodiment of the packaged coolant including a section illustrating an internal sponge 104. This package design is used for the coolant in its liquid state or very low viscosity gel state. In order to create a packaged article of manufacture that can be used in a plurality of applications, according to one embodiment and without limitation, the gel coolant compound is inserted in a porous material absorbing element 104 substantially equivalent to a sponge which is then surrounded and protected by an external waterproof material 100. As an example, the external waterproof material 100 can be a tissue, an absorbent polymer, or a superabsorbent polymer with a synthetic waterproof coating in its interior and thermosealed 108 in order to prevent leakage of the gel compound inserted in the sponge covered by the waterproof material. The external material 100 is chosen in order to enhance the coolant action of the overall article of manufacture by 1) protecting the underlying chemical composition and isolating it from the external environment in order to increase the duration of action, and 2) having thermal properties such as high thermal conductivity. In other embodiments for particular applications the gel is inserted directly into the interior of the external element and no sponge is used.

In one embodiment, the external waterproof material 110 surrounding the sponge 104 includes a valve 106, 108 especially adapted so that the liquid or low viscosity gel coolant compound can be easily inserted into the internal absorbing element inside the waterproof external material 100. According to one embodiment, the gel coolant is inserted until the internal absorbing element is completely soaked. The absorbing element 104 comprises a porous material such as a natural or synthetic sponge or may be absent and the gel compound is inserted instead. The synthetic sponge can be made from cellulose wood fibres, or foamed plastic polymers. This sponge 104 may be of PVA (very dense, highly absorbent material with no visible pores) and polyester. According to one embodiment, the absorbent element 104 is a polyurethane sponge and the gel is introduced until reaching maximum saturation of the sponge. Finally, the packaged composition can include an external fabric for aesthetic reasons.

C.2. Packages for the Solid Coolant Composition

Figure 3:
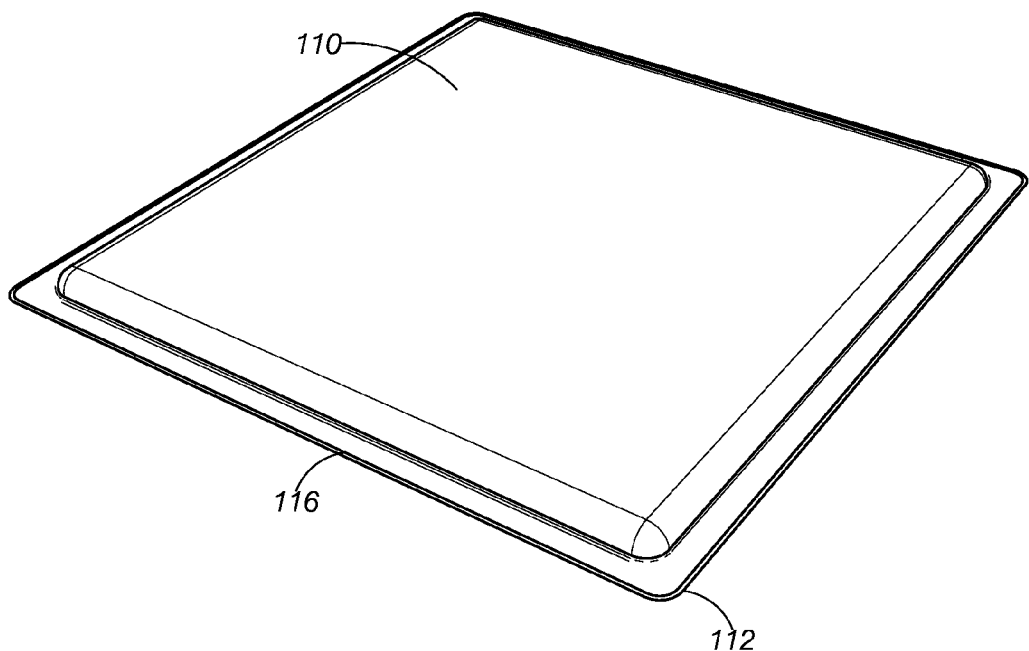
FIG. 3 shows an alternative embodiment of the packaged coolant in its solid state.
Figure 4:
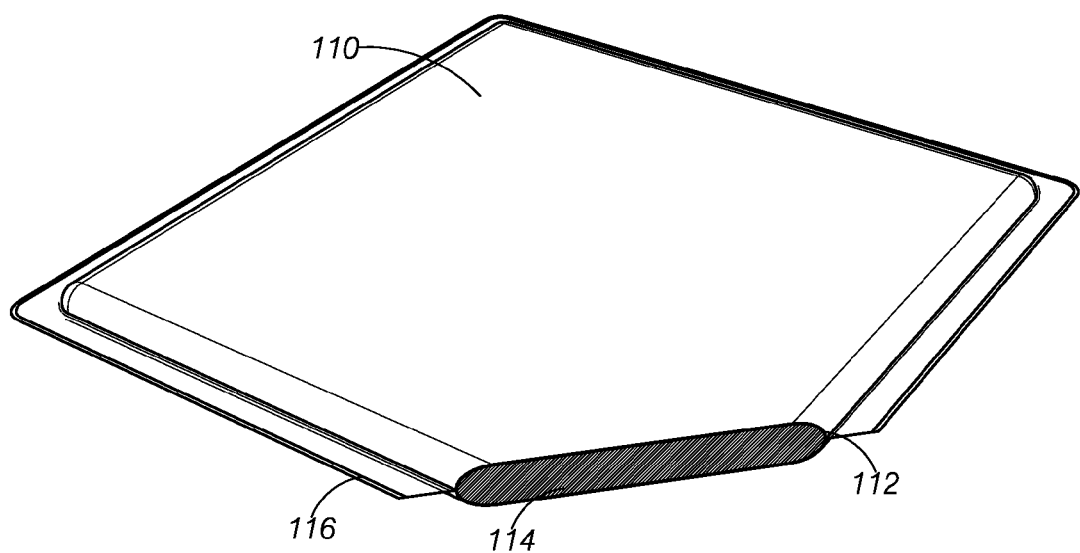
FIG. 4 shows an alternative embodiment of the packaged coolant including a section illustrating the solid compound as the internal element.

FIG. 3 shows another embodiment of the packaged coolant without the valve for use with the solid coolant described herein. FIG. 4 shows an embodiment of the packaged coolant including a section illustrating the internal material 114. In this case, the internal material is the coolant in its solid state.

Alternatively, the packages of specific form factors can be created by starting with the liquid coolant, converting it to a gel, creating the desired form, and then adding paraffin to create the final solid coolant composition.

While particular embodiments of the packaged article have been described, it is understood that, after learning the teachings contained in this application with the disclosed embodiments, modifications and generalizations will be apparent to those skilled in the art without departing from the spirit of the disclosed embodiments.

D. Articles of Manufacture, Uses, and Application Areas

The following section discloses embodiments of articles of manufacture, uses, and applications. These embodiments are meant simply to illustrate possible examples of the packaged coolant composition and should not be interpreted as a limitations.

The coolant composition can be packaged as described above. The form factor, industrial design, ornamental design, and engineering design of the package is adapted for a particular use and application area. The packaged composition can be used to replace the conventional cushion, sponge, or foam included in conventional products in order to create functionally equivalent improved articles of manufacture which have the additional benefit of having a coolant property. As shown in FIGS. 5-11 and explained in the section describing the experimental results, the duration of action of the coolant is temporary and it requires a temperature differential.

Figure 12:
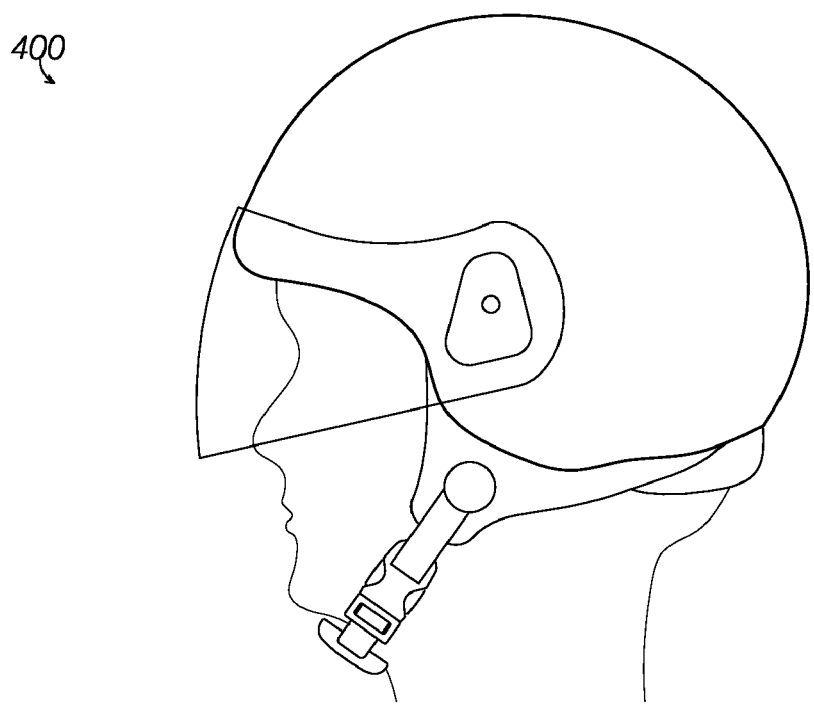
FIGS. 12-14 show an illustrative example of the packaged composition used to create a helmet with coolant properties.
Figure 13:
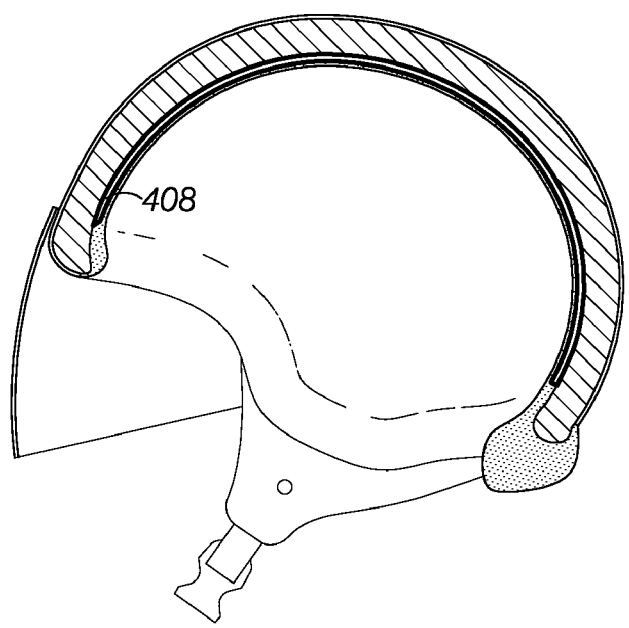
Figure 14:
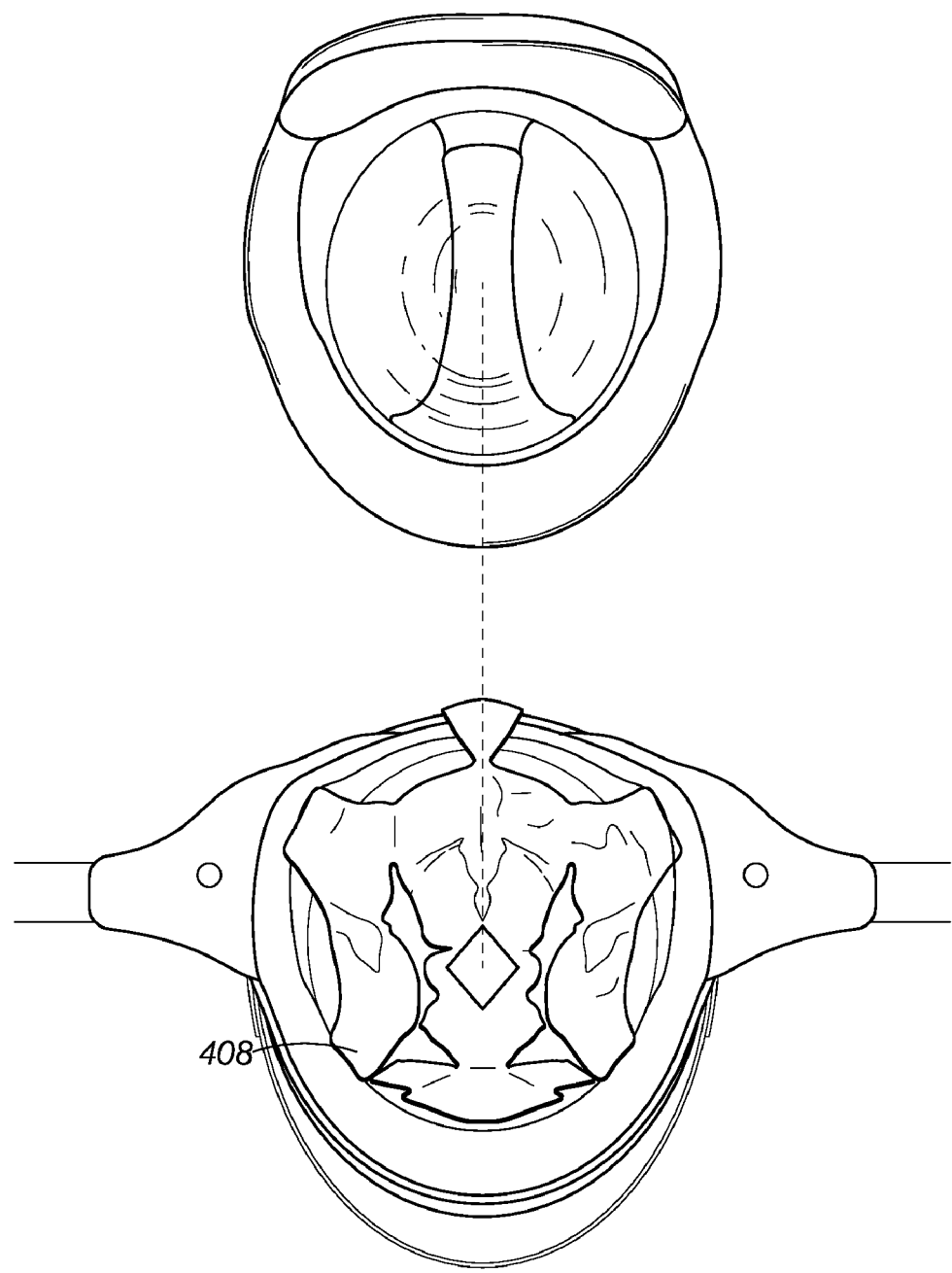
Figure 15:
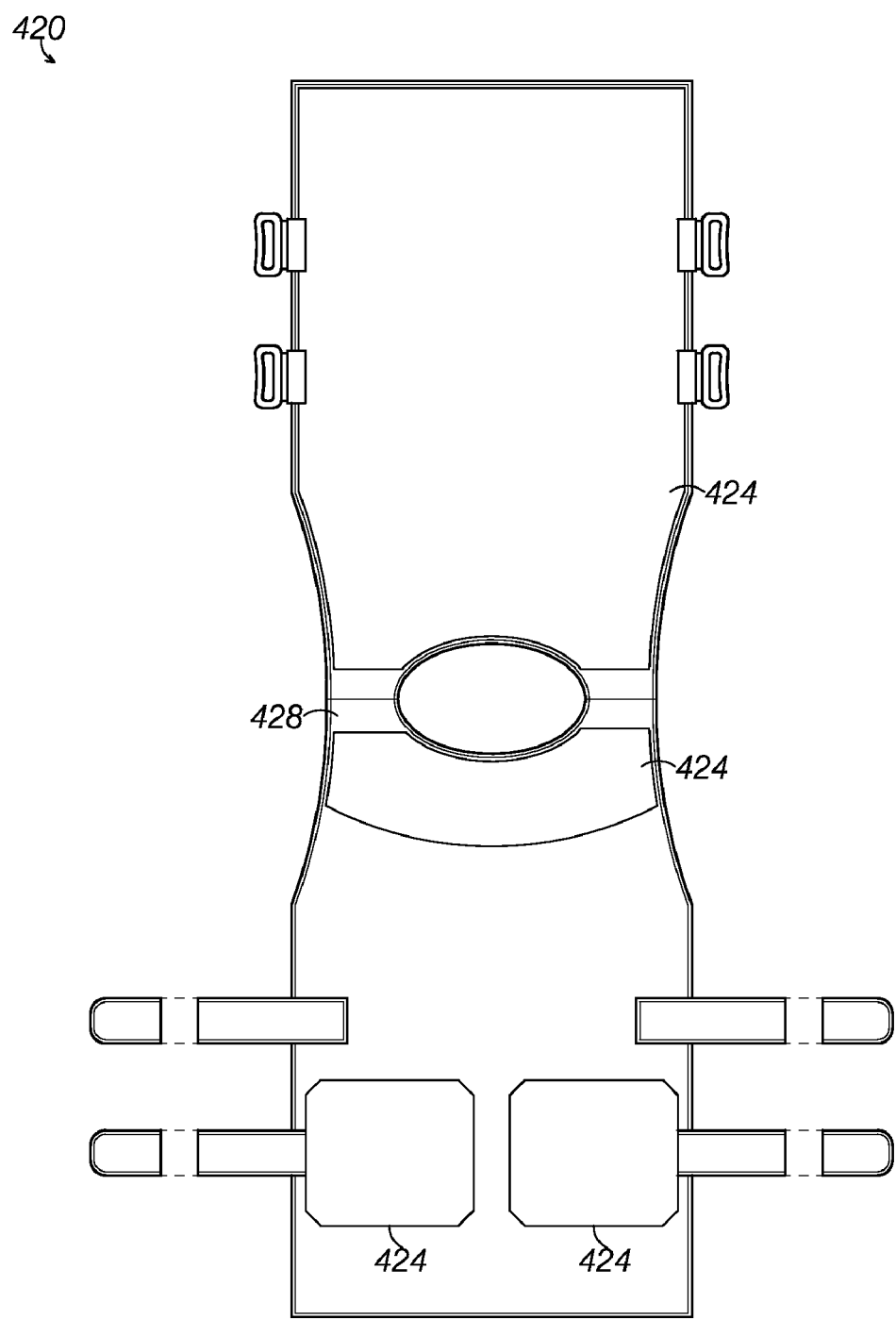
FIGS. 15-19 show an illustrative example of the packaged composition used to create clothing articles with coolant properties.
Figure 17:
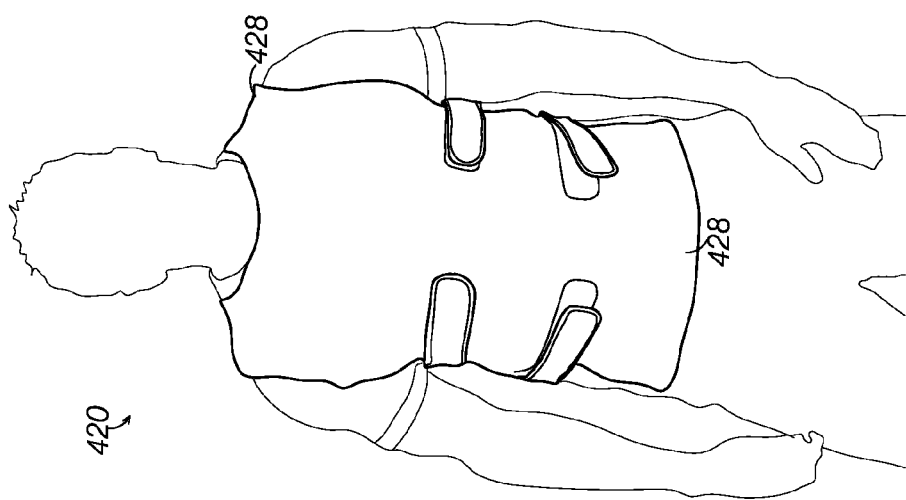
Figure 16:
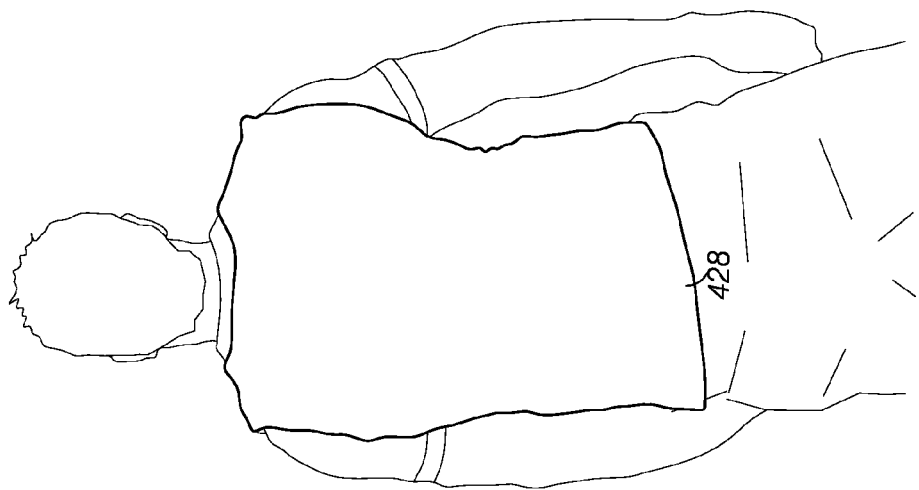
Figure 19:
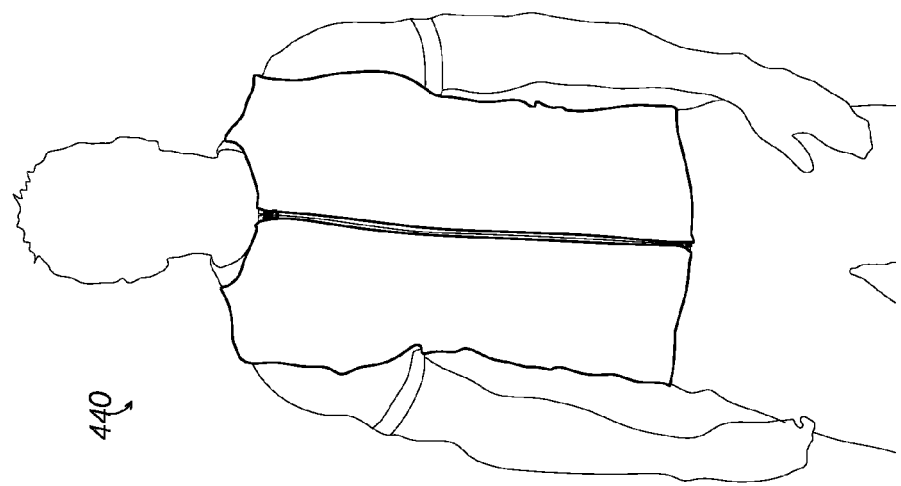
Figure 18:
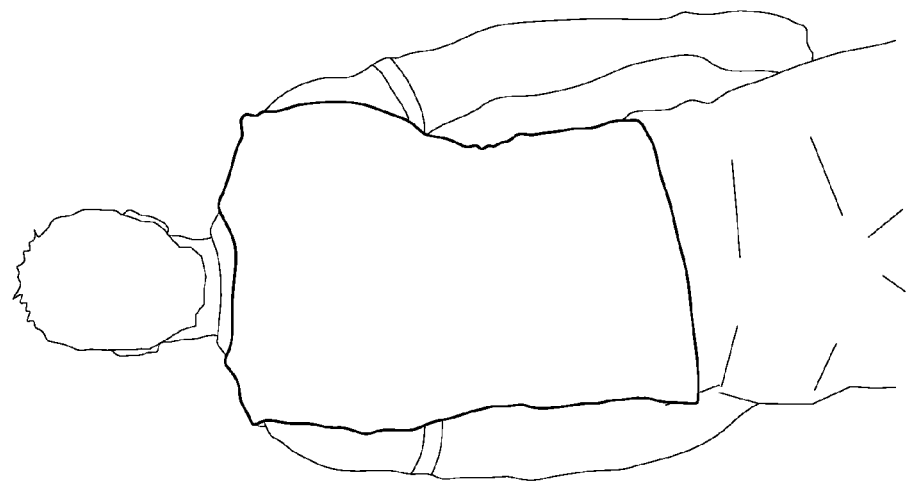
Figure 20:
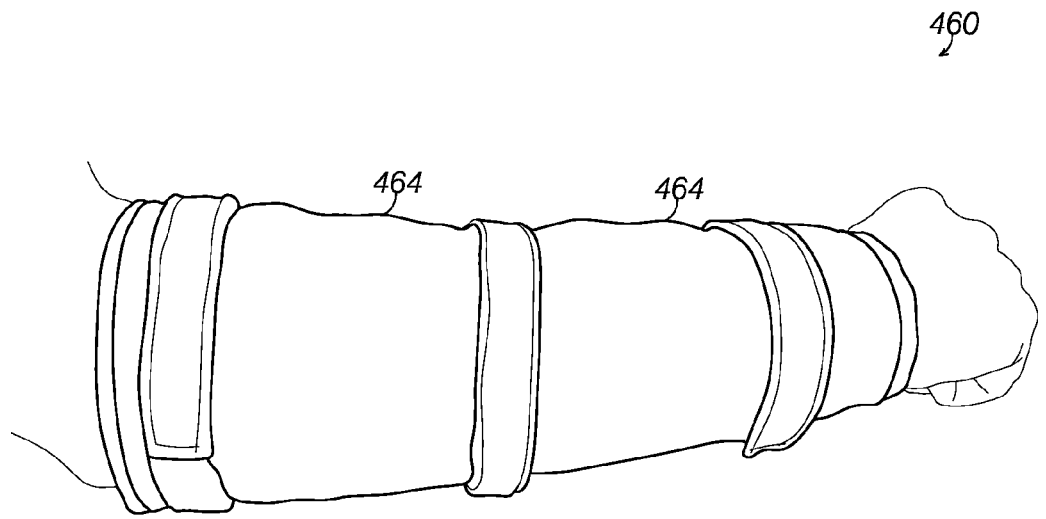
FIGS. 20-22 show an illustrative example of the packaged composition used to create cooling products for temperature management.
Figure 21:
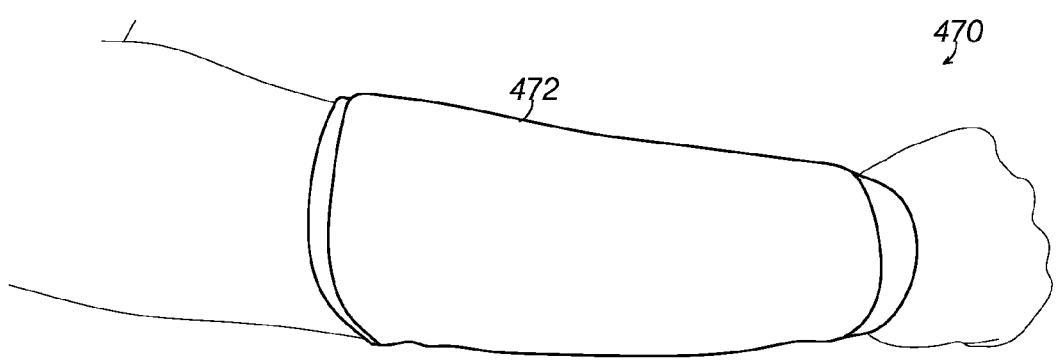
Figure 22:
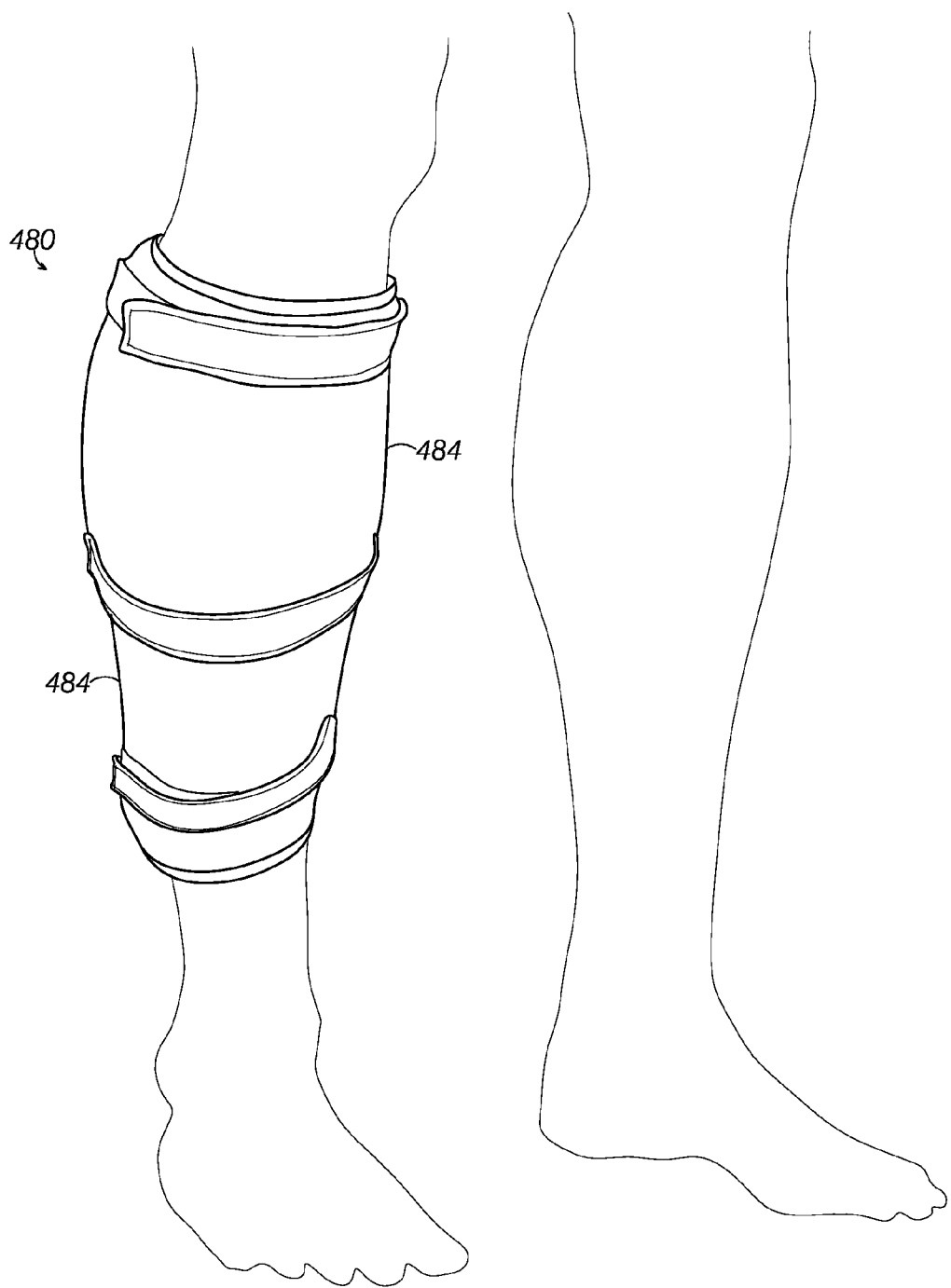
Figure 23:
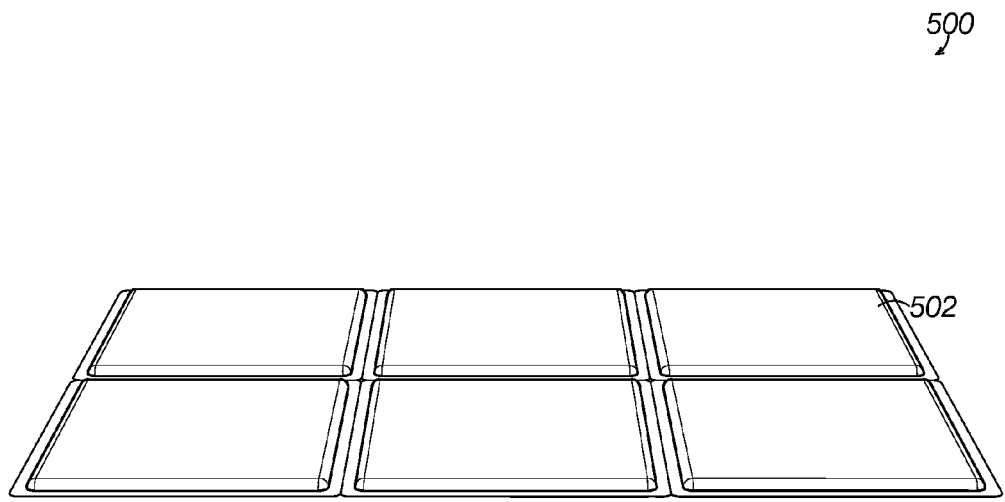
FIGS. 23-27 show an illustrative example of the packaged composition used for bedding, comfort, and medical products such as blankets with coolant properties.
Figure 24:
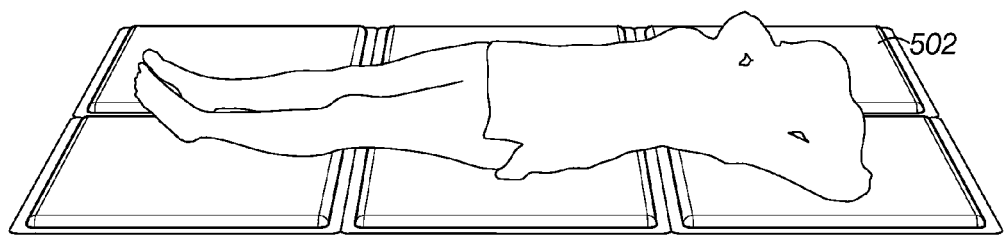
Figure 26:
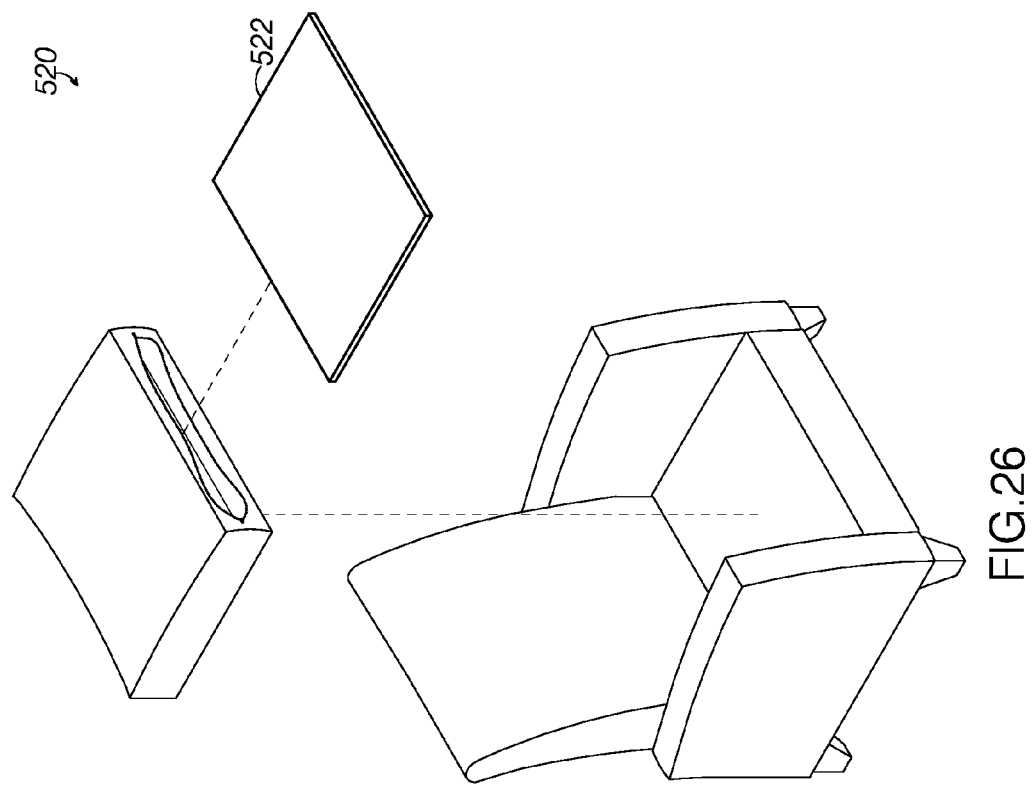
Figure 25:
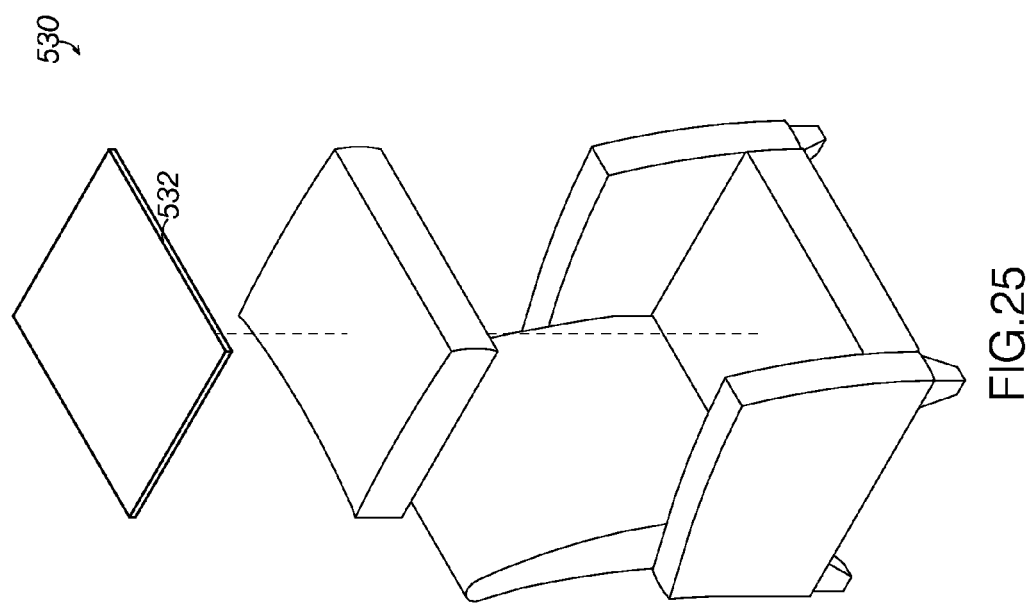
Figure 27:
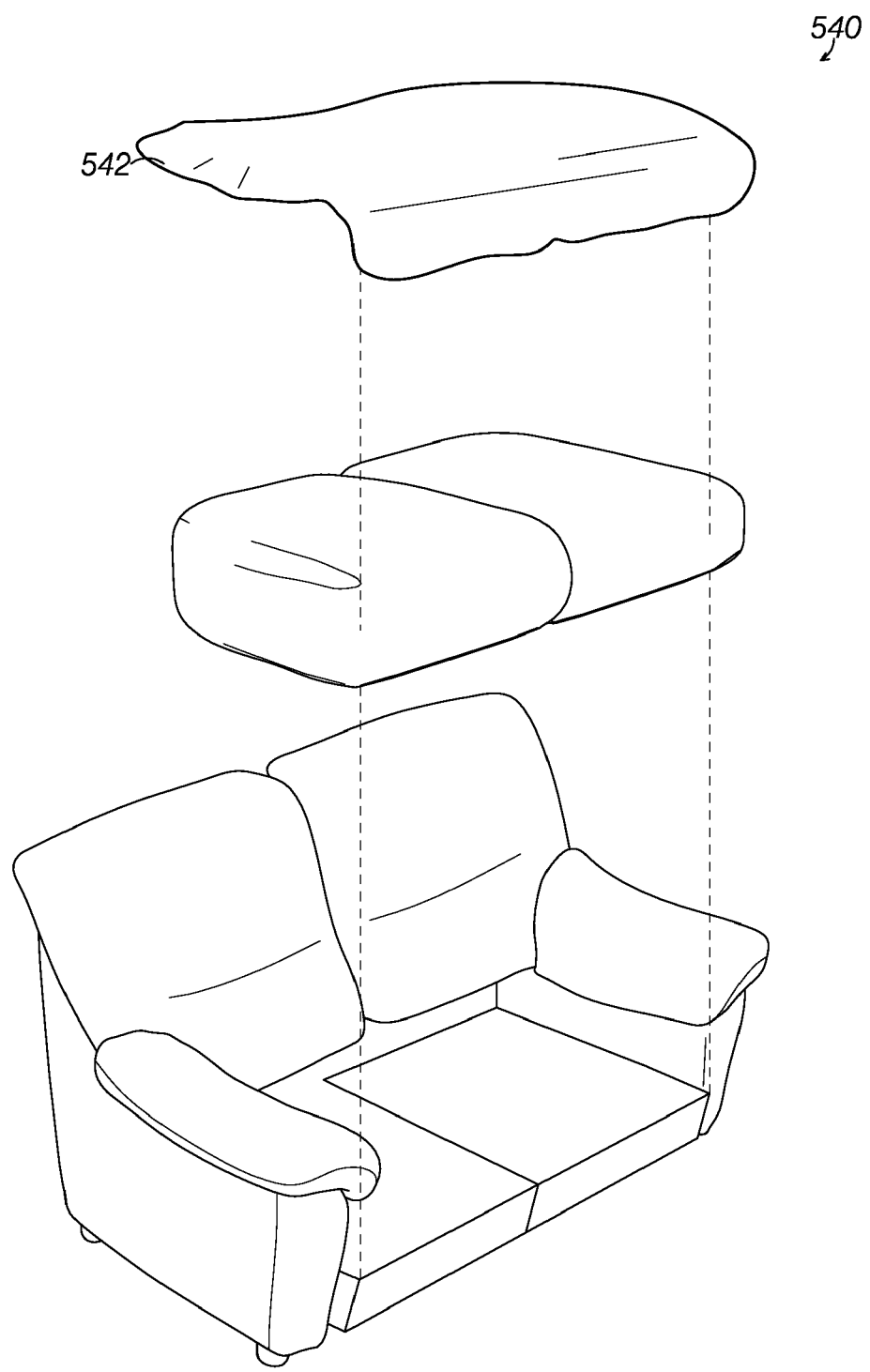

FIGS. 12-21 show illustrations of potential embodiments and applications of the coolant composition. FIGS. 12-14 show an illustrative example of the packaged composition used to create a helmet 400 with coolant properties. FIGS. 15-19 shows an illustrative example of the packaged composition used to create clothing articles (e.g. 420, 440) with coolant properties. FIGS. 20-22 shows an illustrative example of the packaged composition used to create cooling products (e.g. 460, 470, 480) for temperature management. FIGS. 23-27 show an illustrative example of the packaged composition used for bedding, comfort, and medical products (e.g. 500, 520, 530, 540) such as blankets with coolant properties.

FIGS. 15-22 show an illustrative example of the packaged composition used to create clothing articles and other articles with coolant properties. Improved clothing items such as a plurality of vests with coolant properties can be created and especially adapted for job functions where coolant properties are desired such as military clothing for high temperature environments, firefighters, high-temperature factory environments, and cooks. Improved article of manufacture such as clothing (e.g. vest, pants, jackets, etc) are created by replacing part or all of the traditional internal cushion material by an embodiment of the packaged coolant composition (e.g. 424, 408, 428, 464, 472, 484, 502, 522, 532, 542.) In general the composition can be used in diverse technical applications where coolant properties are desired.

FIGS. 23-27 shows an illustrative example of the packaged composition used for bedding, comfort, and medical products such as blankets with coolant properties. Improved articles of manufacture such as chairs, sofas, pillows, mattresses, mats, helmets, caps, sleeping masks are created by replacing part or all of the traditional cushion material, foam material, or sponge material by an embodiment of the packaged coolant composition (e.g. 502, 522, 532, 542). The external fabric can be maintained for aesthetic reasons or a similar looking fabric with enhanced thermal properties can be used.

Improved lining fashion articles and clothing are created by replacing inner liner and adding an appropriately packaged coolant composition. Similarly, clothing such as sports clothing can be improved by adding coolant properties.

Improved footwear items such as shoes including dress shoes, tennis shoes, and others can be enhanced by adding a coolant element of the appropriate thickness and design. According to one embodiment, the shoe sole is created in the spirit of the disclosed embodiments in order to have coolant properties.

Improved orthopedics, rehabilitation, medical, and physical therapy. Since cold is applied in most cases involving recoveries from injuries both in people and in animals, improved orthopedic materials can be made by an embodiment of the packaged coolant compound. In some cases the compound replaces a traditional element and in other applications it is simply included as an additional element to create the improved article of manufacture, device or apparatus. FIGS. 20-22 show an illustrative example.

Improved toys such as teddy bears and other stuffed toys serving for the function of comforting children can be designed by replacing part or all of the internal stuffing for the packaged coolant composition.

Other applications include cooling bags such as computer bags, cooling electronics equipment, cooling appliances, cooling a plurality of sport devices, cooling a plurality of textiles, etc.

While particular embodiments of the packaged article and derived articles have been described, it is understood that, after learning the teachings contained in this application with the disclosed embodiments, modifications and generalizations will be apparent to those skilled in the art without departing from the spirit of the disclosed embodiments.

E. Testing and Experimentation

Below we detail the testing and experimentation conducted to evaluate the characteristics of the compound in its liquid and gel states. These experiments demonstrate the coolant properties of the underlying composition without paraffin.

E1. Introduction

The testing and experimentation carried out was aimed at quantifying the degree of empirical absorption or emission of heat from the material to verify its effectiveness as a coolant material if it were to be used in a textile embodiment for the purposes of cooling the human body.

E.2. Thermal Manikin

Figure 5:
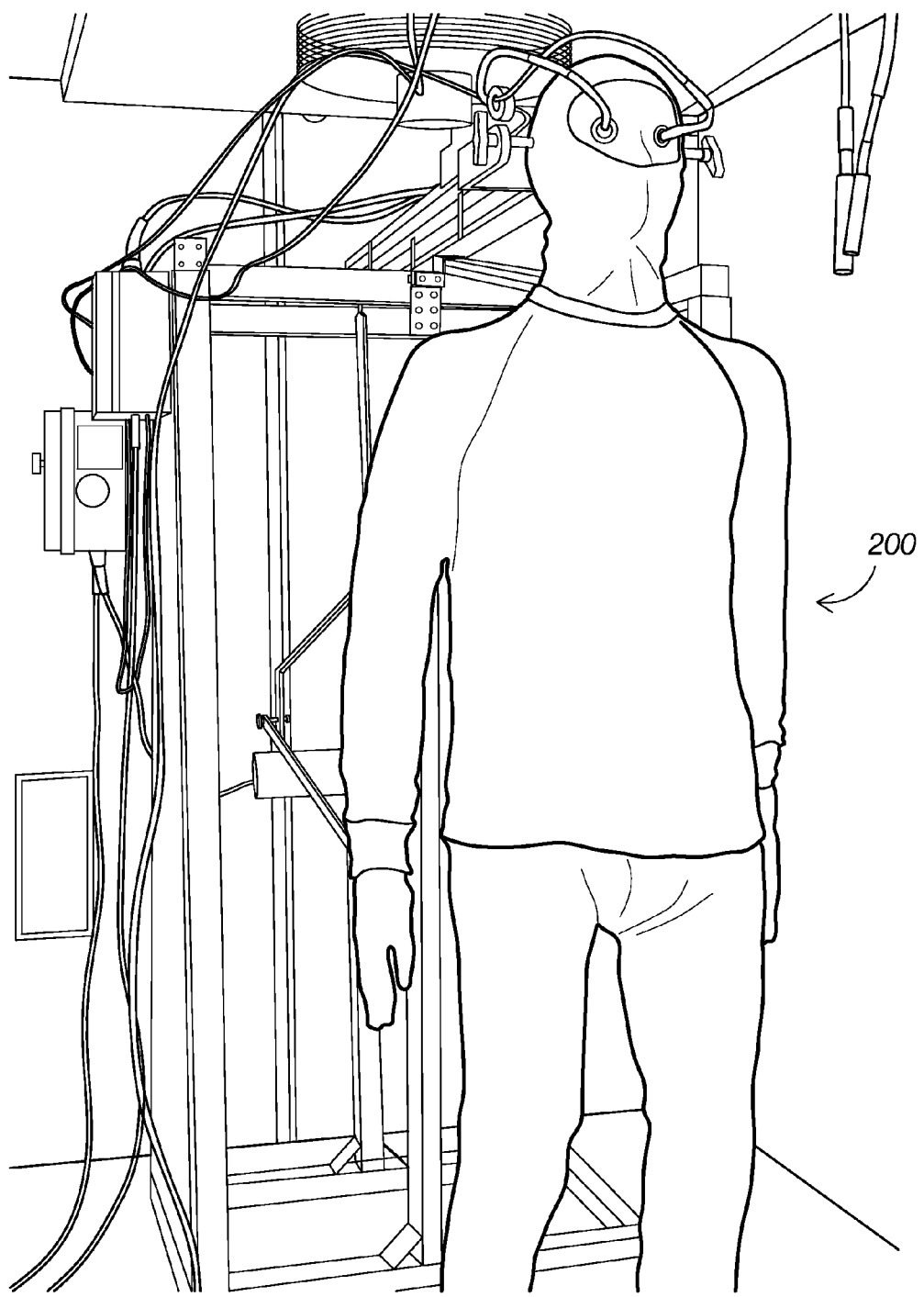
FIG. 5 shows an illustrative representation of the manikin and setup used during experimentation.

Characterization by means of a thermal manikin is one of the main tools for conducting measurements of thermal insulation or cooling. This is a fundamental property in order to determine if a textile article is capable of maintaining the human body cool or hot. FIG. 5 shows an illustration of the manikin 200 used during experimentation.

The thermal manikin was chosen to simulate a human being with a height of 1.70 m and a total area of 1.77 $m^2$ producing heat while he performs a physical activity or is in a rest state. The calculation of thermal insulation by use of the thermal manikin can be done with the thermal manikin static or in motion, simulating a person walking.

The manikin is located within a climatic chamber that can be controlled by different environmental conditions including the selection of both temperature and moisture in air velocity. This information is important to characterize the system under different climatic conditions.

E.3 Experimental Part

Figure 6:
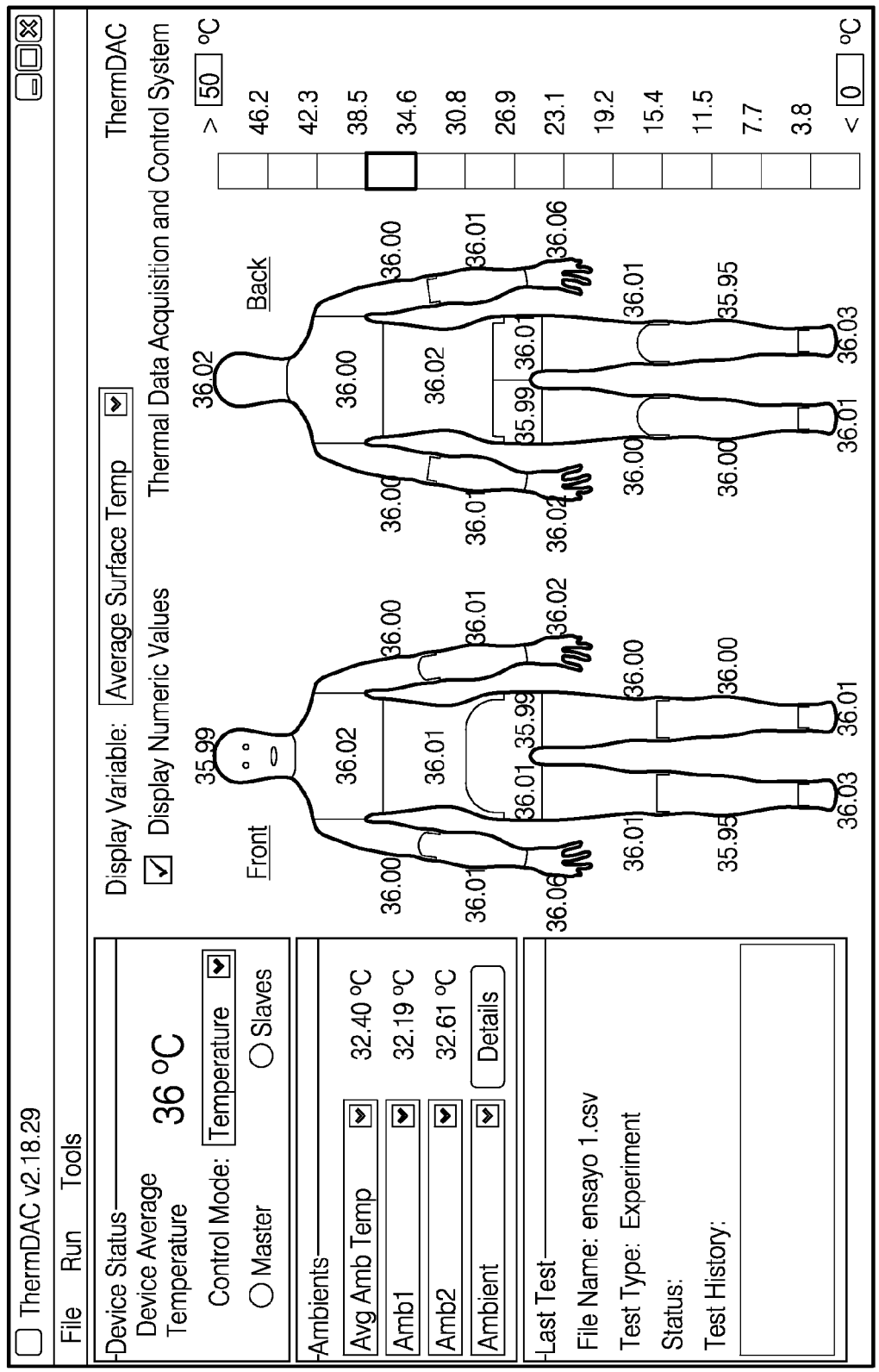
FIGS. 6-11 show the results of experiments designed to characterize the coolant properties of the composition.

The investigations are based on providing a flow in each of the 20 areas in which the thermal manikin is subdivided for a constant temperature of 35° C. throughout the body in order to calculate the thermal insulation or cooling of the material under study (FIG. 6).

The test is based on incorporating the coolant material over a specific area. In this case, 20 different areas covering the manikin chest were chosen.

E.4 Results

Four different test samples containing different compositions were tested to evaluate their effectiveness. FIGS. 6-11 show the results of experiments designed to characterize the coolant properties of the composition.

E.4.A. Test Sample Compositions

Test Sample 1 included: a) 80 ml of glycerol, b) 0.8 g of barium hydroxide, c) 4.8 g of menthol with 48 ml of water, d) 2 ml calcium hydroxide, and e) 1870 ml of water. Test Sample 2 included: a) 80 ml of glycerol, b) 0.8 g of barium hydroxide, c) 2 ml calcium hydroxide, and d) 1870 ml of water.

Test Sample 3 included: a) 0.8 g of barium hydroxide, b) 4.8 g of menthol with 48 ml of water, c) 2 ml calcium hydroxide, and d) 1870 ml of water.

Test Sample 4 included: a) 0.8 g of barium hydroxide, b) 2 ml calcium hydroxide, and c) 1870 ml of water.

For each solution, 750 ml was introduced in pads measuring 30 cm×30 cm especially designed for the test and applied on the chest of the thermal manikin with a constant weight of 10 kg.

The conditions of temperature and relative humidity of the climatic chamber were held constant at 30° C. and 50%, respectively. The software used for the measurement of heat flow to maintain constant body temperature of the thermal manikin at 36° C. was ThermDAC v.2 In FIG. 6 we can see an example of the screen to control the environmental temperature of the climatic chamber and body temperature of the thermal manikin.

E.4.B. Initial Conditions

At 30° C. ambient temperature, the system provides a flow of heat of 50 W/$m^2$ to maintain a constant body temperature of 36° C.

E.4.C. First Test

Figure 7:
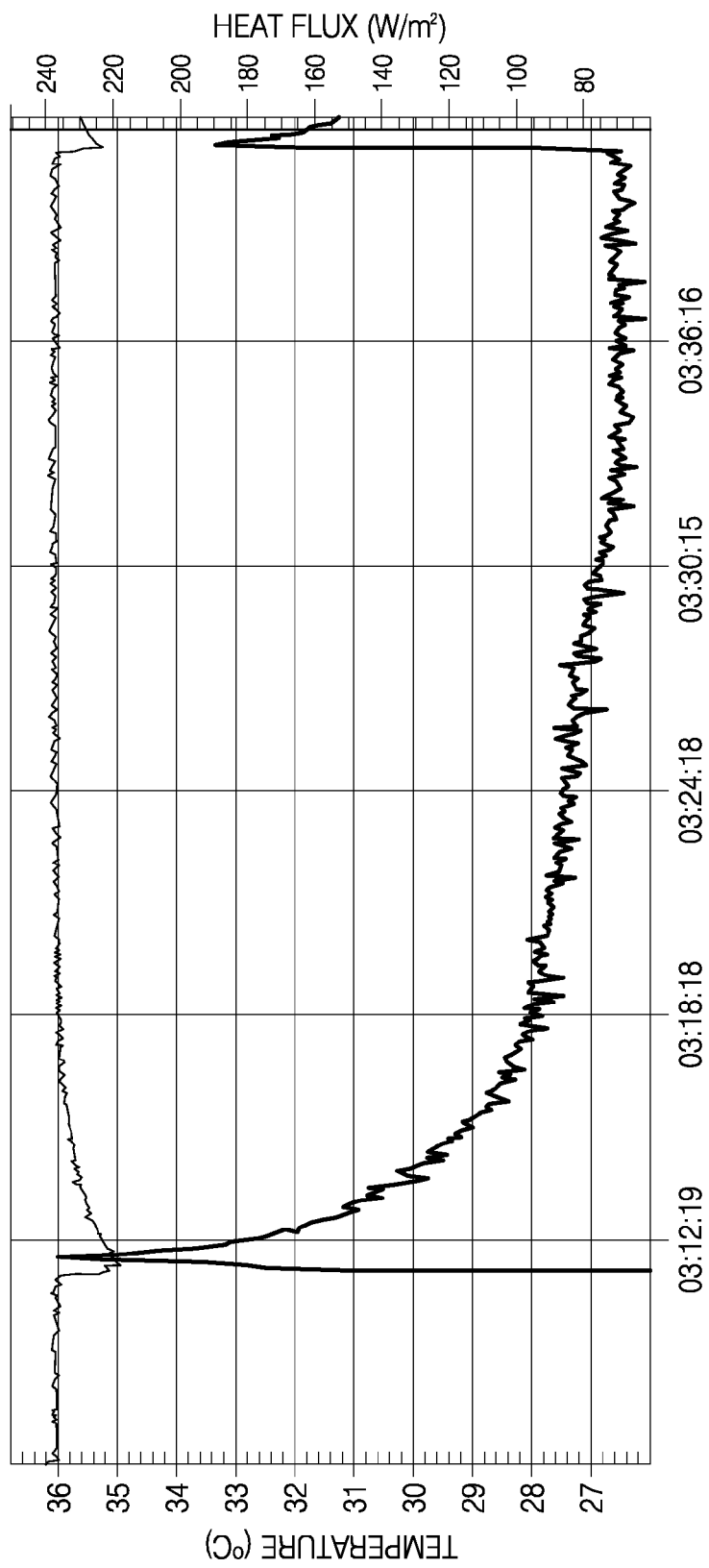

The first Test included the following conditions: 1) Ambient Temperature=30° C., 2) Test Sample 3, 3) Exposure Time=30 minutes, and 4) Pressure=10 kg. FIG. 7 shows the results of this test. This test sample results in a cooling effect that requires the system to provide a peak flow of heat of 240 W/$m^2$ in order to maintain the manikin at 36° C. The system had to provide heat flow during the 30 minutes of the test ranging from 240 W/$m^2$ (peak) to 60-70 W/$m^2$ (minimum) at 30 minutes.

E.4.D. Second Test

Figure 8:
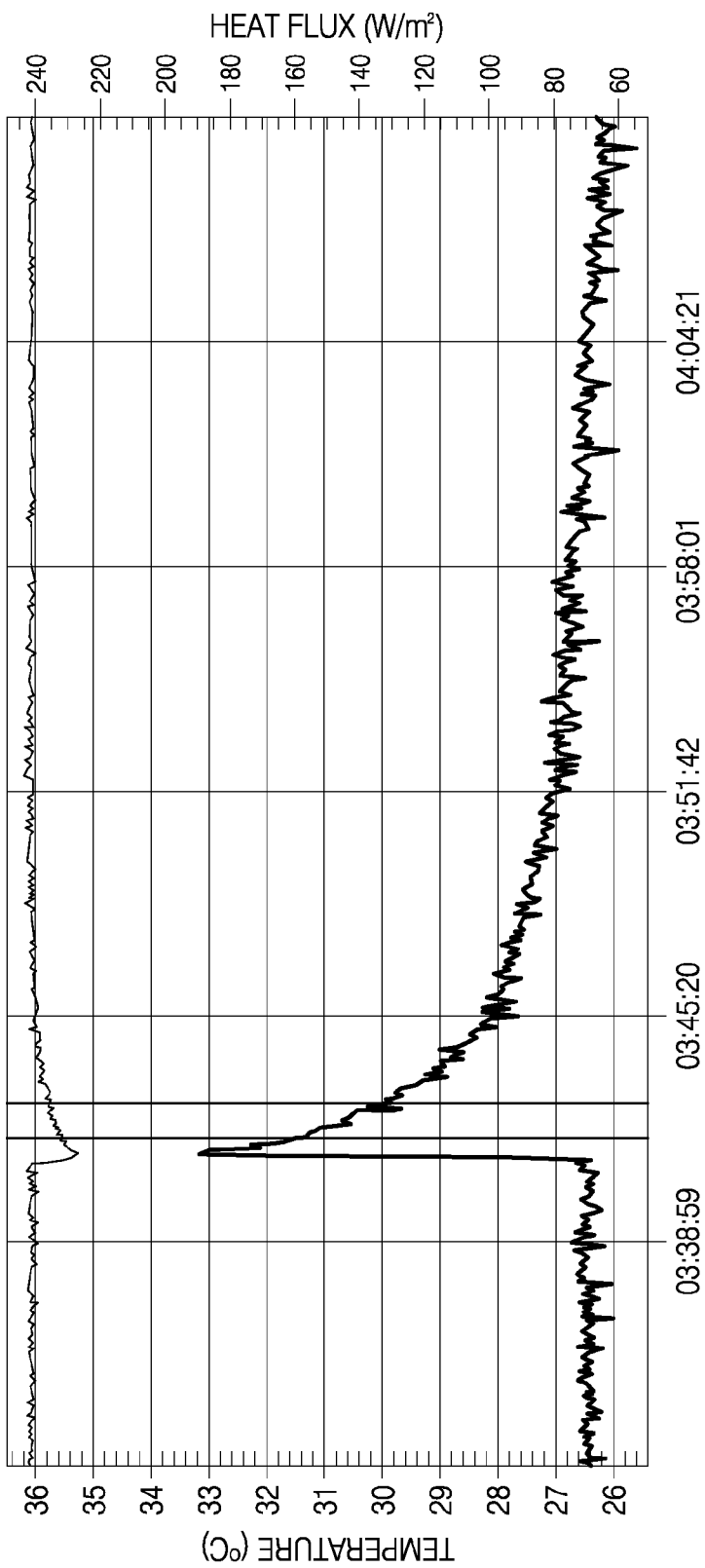

The second Test included the following conditions: 1) Ambient Temperature=30° C., 2) Test Sample 2, 3) Exposure Time=30 minutes, and 4) Pressure=10 kg. FIG. 8 shows the results of this test. This test sample results in a cooling effect that requires the system to provide a peak flow of heat of 190 W/m² in order to maintain the manikin at 36° C. The system had to provide heat flow during the 30 minutes of the test ranging from 190 W/m² (peak) to 60-65 W/m² (minimum) at 30 minutes.

E.4.E. Third Test

Figure 9:
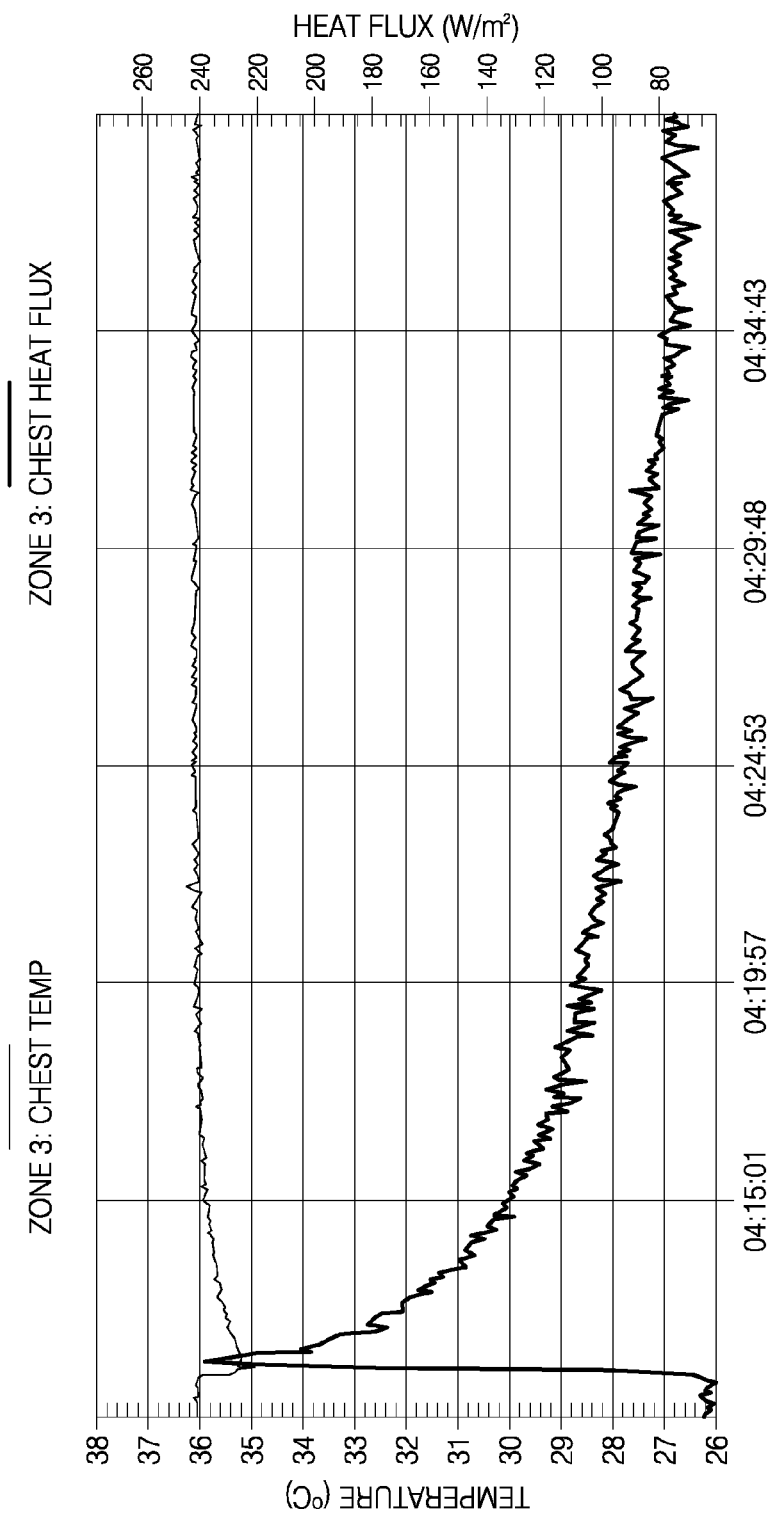

The third Test included the following conditions: 1) Ambient Temperature=30° C., 2) Test Sample 1, 3) Exposure Time=30 minutes, and 4) Pressure=10 kg. FIG. 9 shows the results of this test. This test sample results in a cooling effect that requires the system to provide a peak flow of heat of 240 W/m² in order to maintain the manikin at 36° C. The system had to provide heat flow during the 30 minutes of the test ranging from 240 W/m² (peak) to 80 W/m² (minimum) at 30 minutes.

E.4.F. Fourth Test

Figure 10:
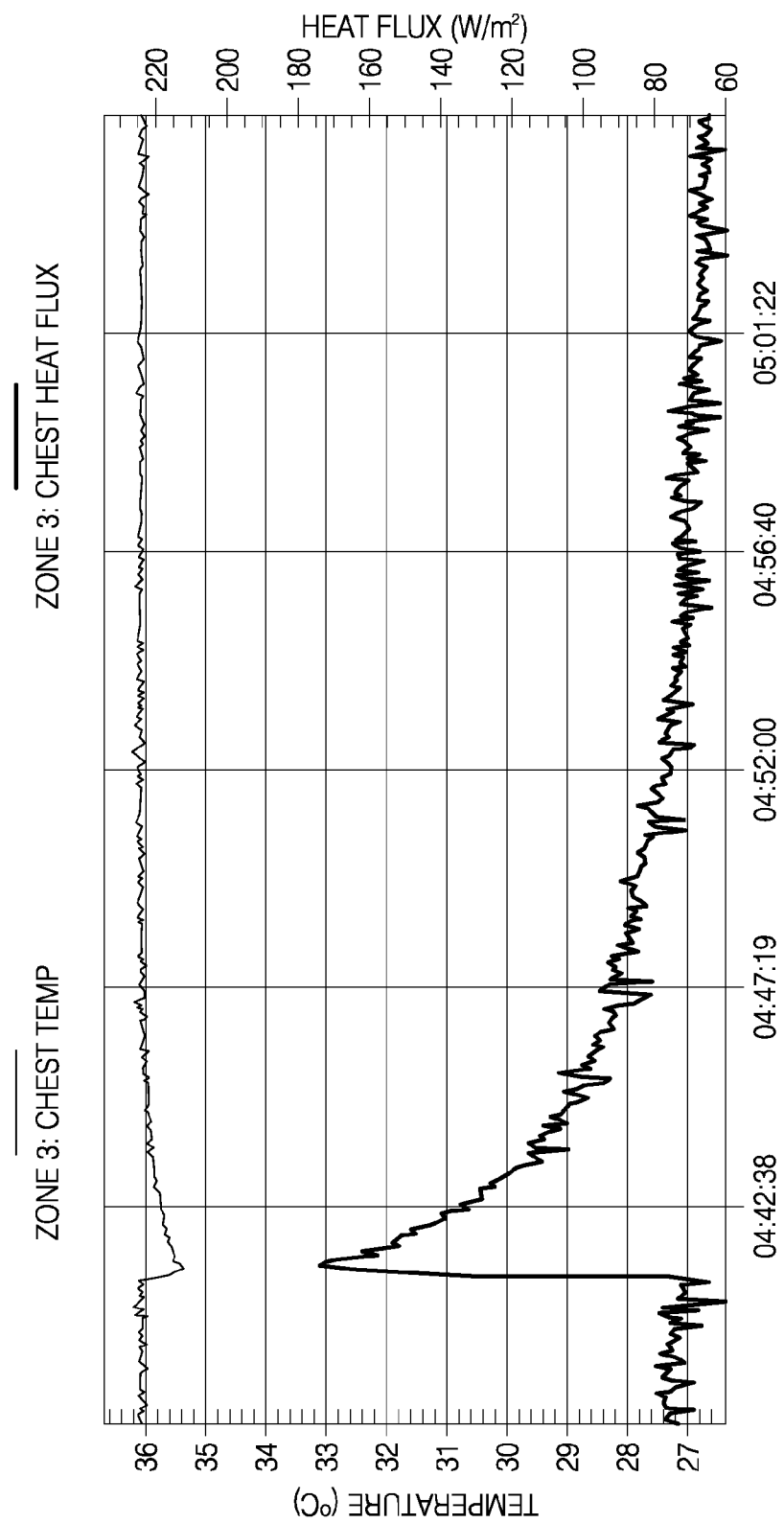

The fourth Test included the following conditions: 1) Ambient Temperature=30° C., 2) Test Sample 4, 3) Exposure Time=30 minutes, and 4) Pressure=10 kg. FIG. 10 shows the results of this test. This test sample results in a cooling effect that requires the system to provide a peak flow of heat of 170 W/m² in order to maintain the manikin at 36° C. The system has to provide heat flow during the 30 minutes of the test ranging from 170 W/m² (peak) to 60-65 W/m² (minimum) at 30 minutes.

E.4.G Results and Conclusions

Figure 11:
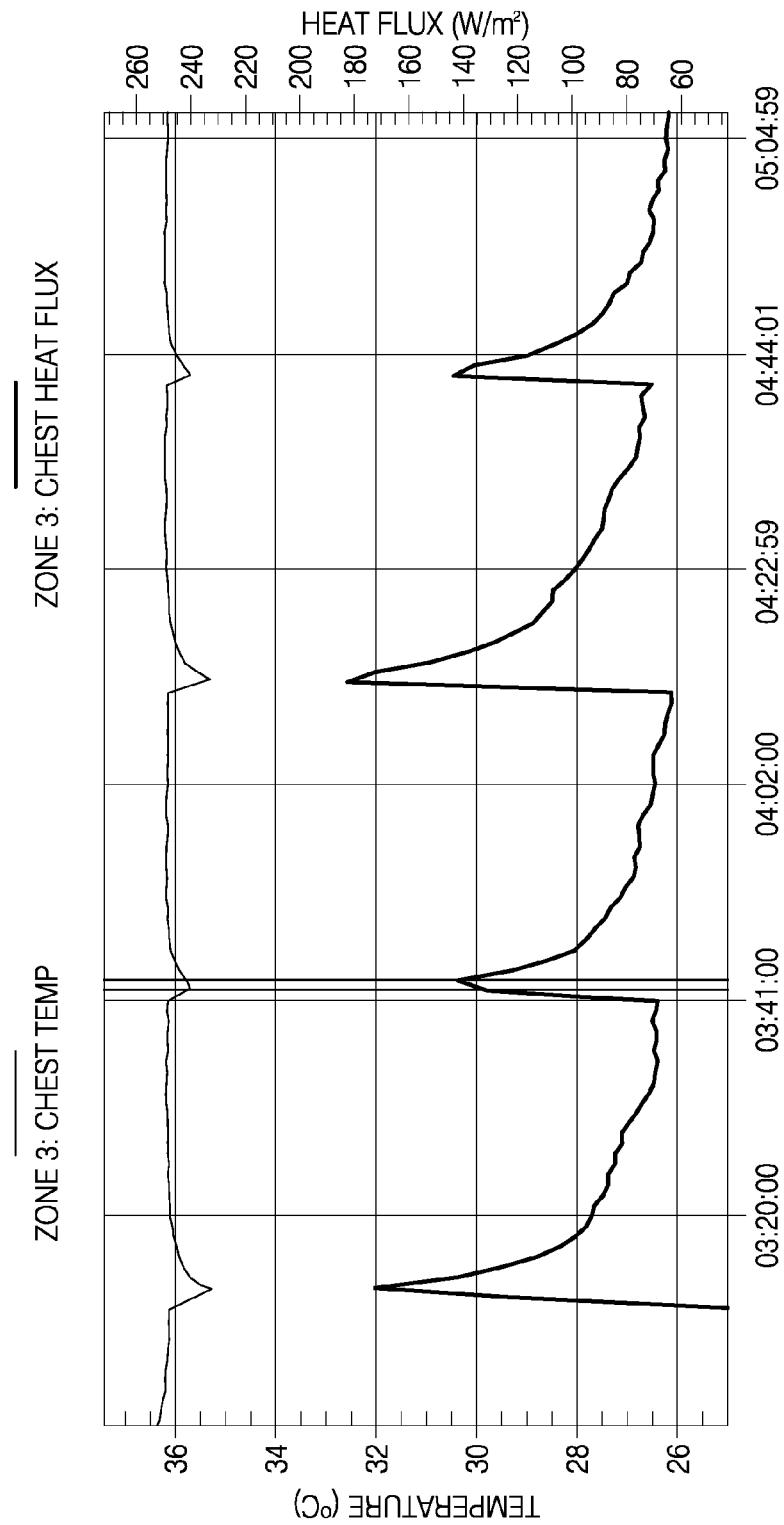

The experimental results show the cooling properties of different embodiments. FIG. 11 shows the summary results. The coolant composition comprising a) 80 ml of glycerol, b) 0.8 g of barium hydroxide, c) 4.8 g of menthol with 48 ml of water, d) 2 ml calcium hydroxide, and e) 1870 ml of water resulted in a cooling effect that required the system to provide a peak flow of heat of 240 W/m² in order to maintain the manikin at 36° C. The system had to provide heat flow during the 30 minutes of the test ranging from 240 W/m² (peak) to 80 W/m² (minimum) at 30 minutes which indicates a duration of action beyond 30 min.

While particular embodiments of coolant composition, the associated coolant packaged article and derived articles have been described, it is understood that, after learning the teachings contained in this application with the disclosed embodiments, modifications and generalizations will be apparent to those skilled in the art without departing from the spirit of the disclosed embodiments.

The invention claimed is:

1. A coolant composition comprising:
   (a) glycerol;
   (b) an aqueous solution of menthol;
   (c) calcium hydroxide;
   (d) barium hydroxide; and
   (e) water.

2. The coolant composition of claim 1, further comprising sodium polyacrylate resulting in a gel with coolant properties.

3. The coolant composition of claim 2, further comprising paraffin resulting in a solid with coolant properties.

4. The coolant composition of claim 1, wherein said glycerol is 3-10% by weight, said aqueous solution of menthol is 0.1-1.2% by weight, said calcium hydroxide is 0.06-0.1% by weight, said barium hydroxide is 0.02-0.08% by weight, and said water is 90-97% by weight.

5. The coolant composition of claim 4, further comprising 1-4% by weight of sodium polyacrylate.

6. The coolant composition of claim 5, further comprising 0.8-5% by weight of paraffin.

* * * * *